July 19, 1960

W. F. PLUME 2,945,574

AUTOMATIC HYDRAULIC CONTROL FOR CLUTCH

Filed July 9, 1954

INVENTOR.
WILLIAM F. PLUME
BY
Edward G. Vanderlip
AGENT

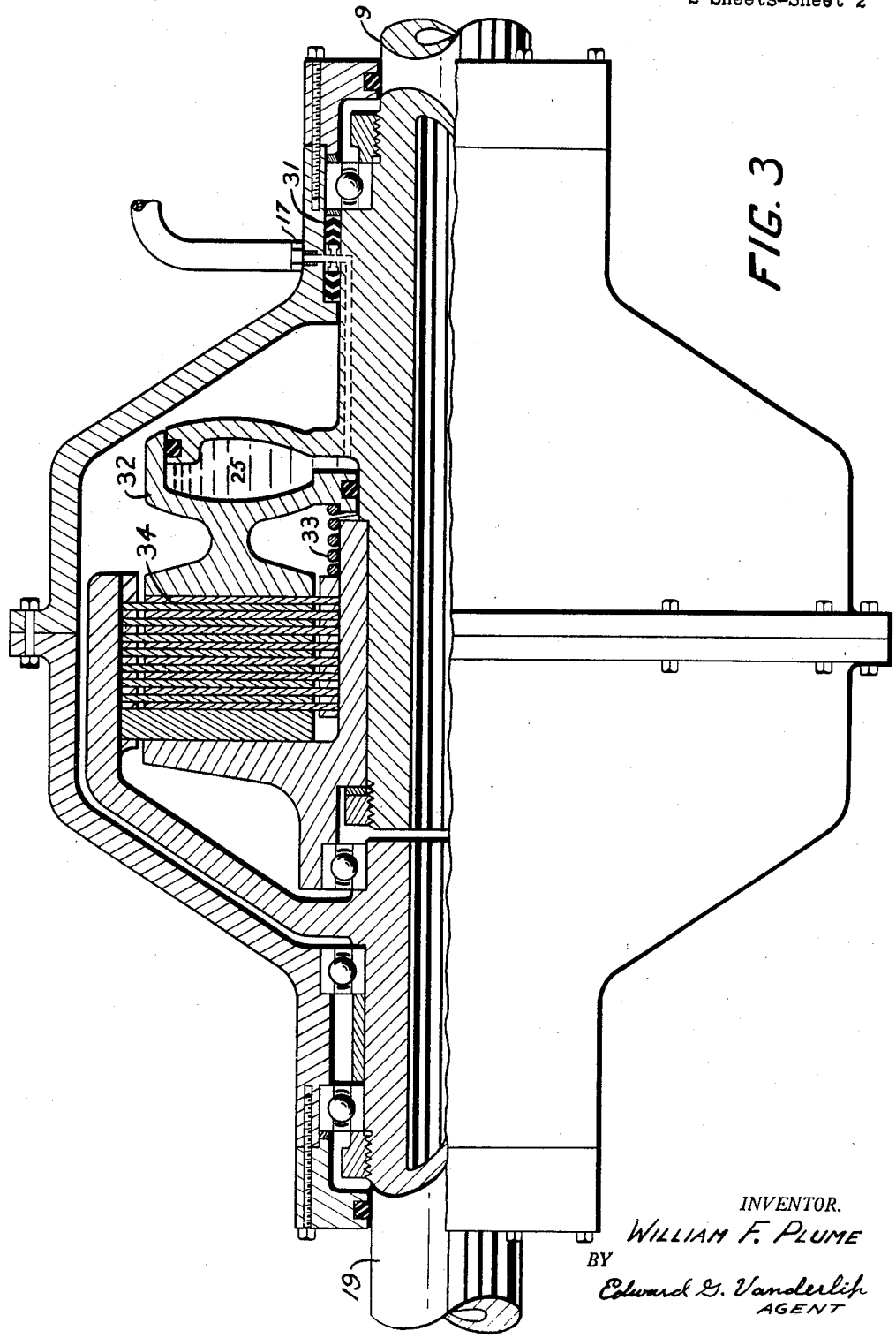

United States Patent Office 2,945,574
Patented July 19, 1960

2,945,574
AUTOMATIC HYDRAULIC CONTROL FOR CLUTCH

William F. Plume, Audubon, N.J., assignor, by mesne assignments, to Boeing Airplane Company, Seattle, Wash., a corporation of Delaware Filed July 9, 1954, Ser. No. 442,384

2 Claims. (Cl. 192—85)

This invention relates to means to control torque transmitted during engagement of a clutch and provides means to automatically control transmitted torque as a function of the output speed of the clutch. Such control is required, for example, in starting up a helicopter rotor system or other types of systems having high inertia forces. The rotor blades in such a rotor system can be damaged by application of high torque while at rest or at low speeds. As speed is increased, the centrifugal force acting on the blades relieves the bending moment in the blades caused by the rotor torque so that in the operating range full engine torque can be safely applied.

A conventional multidisc clutch with a fixed torque setting capable of transmitting full operating torque can impose too high a torque during starting. A centrifugal clutch in which the transmitted torque is a function of input speed will provide a smooth engagement but is dependent on pilot skill for control of torque. A sudden increase in engine speed during starting can damage the rotors.

The clutching problem becomes very severe at high engagement speeds with the use of conventional disc or centrifugal type clutches. The employment of the present invention will smooth out and control the period of engagement and provide the cushioning action necessary for shock loads if power is suddenly applied to the input side of the clutch.

The principal object of this invention is to eliminate the high starting torque or shock load encountered from clutch engagement at high engine speeds or with sudden increases in engine speed on starting.

It is also the object of this invention to provide a hydraulically actuated clutch which automatically limits the transmitted torque as a function of output speed and which is mechanically simpler and more compact than either a centrifugal shoe type of mechanical clutch or a multidisc clutch mechanically actuated by centrifugal weights through linkage.

A further object of the invention is to provide a clutch with automatically limited torque in which a change in torque capacity is made simply by adjusting a valve while at rest or while running, as compared with mechanical clutches in which centrifugal weights must be changed.

Another object of the invention is to provide a clutch with automatically limited torque in which no adjustment for plate wear need be made, compared with the mechanically actuated centrifugal multidisc clutch in which such wear take-up is required.

Another object of the invention is to provide a clutch with automatically limited torque which can be partially or completely declutched while operating at full speed, as compared with mechanical centrifugal clutches which usually must be slowed to a low speed to declutch against the centrifugal force.

Other objects or advantages of the invention will be evident from the drawings and description of operation.

Referring now to the drawings in which like elements are designated by the same reference characters throughout all the figures:

Fig. 3 is a partial cross-section view of the main driving clutch.

Figure 1:
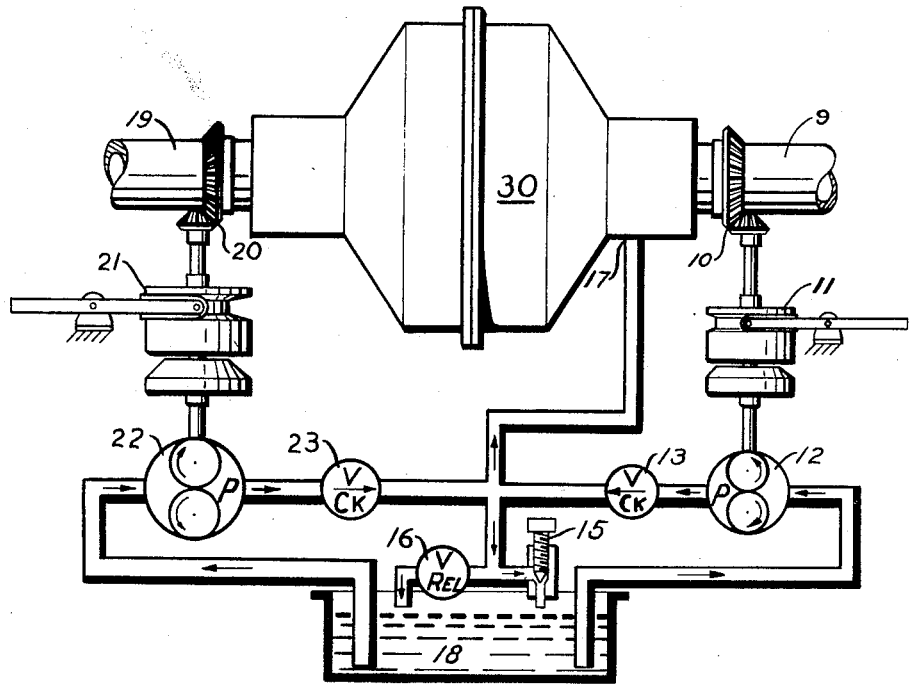
Fig. 1 is a schematic view showing one form of my invention wherein the torque controlling apparatus includes mechanical clutches to operate hydraulic pumps for clutch engagement.

Referring to Fig. 1, an input shaft 9 driven by a power source drives gears 10 and power transmitting clutch 30. Output shaft 19 from clutch 30 is coupled to a driving shaft to which power is to be transmitted and also drives gears 20. Clutches 11 and 21 driven by gears 10 and 20 are used to engage or disengage drives to hydraulic pumps 12 and 22. The conduits shown are connected to pass oil from the reservoir 18 to the pumps 12 and 22, which are of the "positive displacement" type, and to the clutch-operating pressure chamber 25 in power transmitting clutch 30. Check valves 13 and 23 are placed in the conduits as shown and prevent reversal of flow in the discharge lines of the pumps. The pressure line from the pumps connects to the pressure chamber 25 in power clutch 30 at 17. A pressure relief valve 16 is installed to protect the system. A needle valve 15 is used for pressure control. Reservoir 18 supplies oil to hydraulic pumps 12 and 22 and receives discharge from valves 16 and 15.

Figure 2:
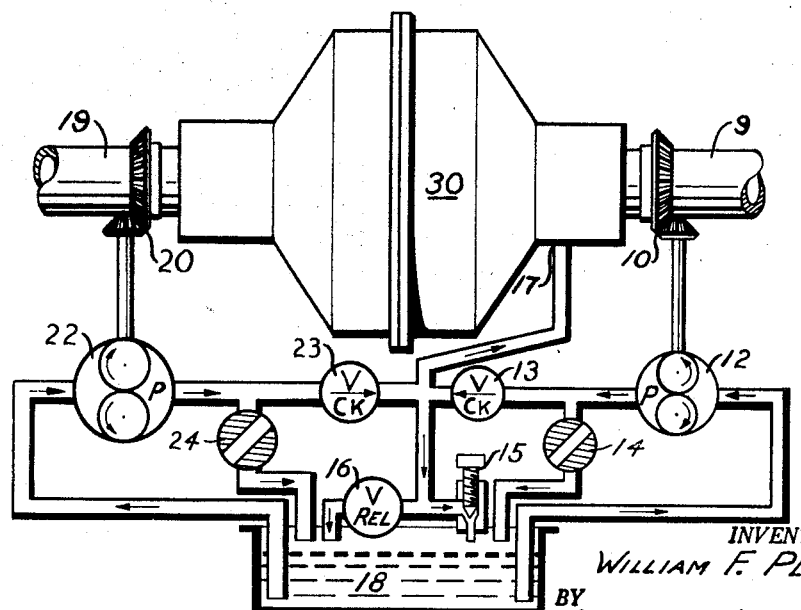
Fig. 2 is a schematic view of a modified form of the invention wherein the control of torque is provided by manually operated bypass valves instead of mechanical clutches as shown in Fig. 1.

Fig. 2 is an alternate arrangement in which the clutches 11 and 21, shown in Fig. 1, are omitted and manually operated bypass valves 14 and 24 are substituted instead in the discharge lines from the hydraulic pumps. In systems where fully automatic control is desired, bypass valves 14 and 24 could be connected for operation by automatic control mechanism.

Fig. 3 shows a partial section of the power clutch 30. Oil under pressure enters at 17, passes between rings of packing 31 and through a hole in shaft 9 to pressure chamber 25 in cylinder 32. Cylinder 32 moves in response to hydraulic pressure against spring 33 to engage clutch plates 34. When pressure in chamber 25 is reduced, spring 33 pushes cylinder 32 back to disengage the clutch plates 34.

Description of operation

The following clutch engagement descriptions refer specifically to helicopter operation but may be used in any application requiring similar clutch characteristics.

For starting the engine that is connected to the input shaft 9 at substantially no load or operating the engine as desired for testing under no load or idling without driving, the output shaft 19 and both friction clutches 11 and 21 are disengaged as shown in Fig. 1. This disconnects the drive to both pumps and no fluid pressure is exerted on cylinder 32 of Fig. 3. The spring 33 will keep the clutch plates 34 disengaged so that no torque is transmitted to the output shaft 19. The engine may then be operated as desired without engaging the helicopter rotors. The opening of both bypass valves 14 and 24 as shown in the modified form in Fig. 2 will have the same effect as disengagement of the friction clutches 11 and 21 in Fig. 1.

For installations where there is danger of engine overspeed that might result in damage to the engine during starting, a resisting torque that is dependent on engine speed can be generated by engagement of the clutch 11 and leaving clutch 21 disengaged. The engagement of clutch 11 operates gear pump 12 which has less capacity than gear pump 22, thus directing fluid pressure to the hydro-clutch cylinder 32 in proportion to input shaft speed. The needle valve 15 is pre-set to an orifice opening such that it will create a back pressure sufficient to compress the spring 33 of Fig. 3 and apply a partial pressure to multiple sets of opposing clutch plates 34. These opposing clutch plates, of which approximately half are attached to the input shaft and the others to the output shaft, transmit torque to the high inertia helicopter rotors as the plates are gradually forced into contact. The amount of torque transmitted to the rotors can be regulated by the needle valve 15 so as to cause any desired degree of partial clutch engagement.

Complete engagement of the clutch for full power transmittal is caused by engaging clutch 21, thereby adding the additional fluid pressure required. Due to the restricted orifice provided by valve 15 this pressure will be proportional to the square of the output speed so that output torque is automatically limited to low values at low speeds and will increase rapidly to give adequate torque capacity to drive at full power when operating speed is reached.

The operation of bypass valves 14 and 24, shown in Fig. 2, for preventing engine overspeed during starting will produce the same results as mentioned above for the friction clutches 11 and 21 of Fig. 1.

It is obvious that the power-clutch 30 can be disengaged at any time by disengaging friction clutches 11 and 21 in Fig. 1 or by opening the bypass valves 14 and 24 in Fig. 2.

What I claim is:

1. An apparatus for transmitting power comprising an input shaft, an output shaft, friction driving means connected to each of said shafts, one of said friction means being movable with respect to said other friction means to permit engagement and disengagement of said friction driving means, spring means connected to said movable friction means to yieldingly hold it out of engagement with said other friction means, a hydraulic actuator connected to said movable friction means to force it into contact with said other friction means for transmittal of torque from said input shaft to said output shaft, and continuous hydraulic pressure supply means connected to said hydraulic actuator comprising, a fluid reservoir, a first pump driven by said input shaft, a second pump driven by said output shaft, said pumps being connected to said hydraulic actuator, means for regulating the pressure delivered to said actuator and manually operated means for controlling independently the operation of either of said pumps, said manually operated means comprising disconnectible driving connections between said input shaft and first pump and between said output shaft and second pump, respectively.

2. An apparatus as set forth in claim 1 and wherein said disconnectible driving connections includes clutches to provide a driving connection between said first and second pumps and said input and output shafts respectively, said clutches being provided for manual disengagement of said pumps.

References Cited in the file of this patent

UNITED STATES PATENTS

| | | |
|---|---|---|
| 794,899 | Sturtevant | July 18, 1905 |
| 1,579,540 | Jackson | Apr. 6, 1926 |
| 1,661,613 | Jackson | Mar. 6, 1928 |
| 2,092,104 | Bowden | Sept. 7, 1937 |
| 2,313,187 | Williamson | Mar. 9, 1943 |
| 2,328,092 | Nutt et al. | Aug. 31, 1943 |
| 2,381,786 | Tyler | Aug. 7, 1945 |
| 2,413,081 | Schaeffer | Dec. 24, 1946 |
| 2,756,851 | Collins | July 31, 1956 |
| 2,893,525 | McDowall et al. | July 7, 1959 |